May 15, 1951     G. H. ZEH ET AL     2,553,072

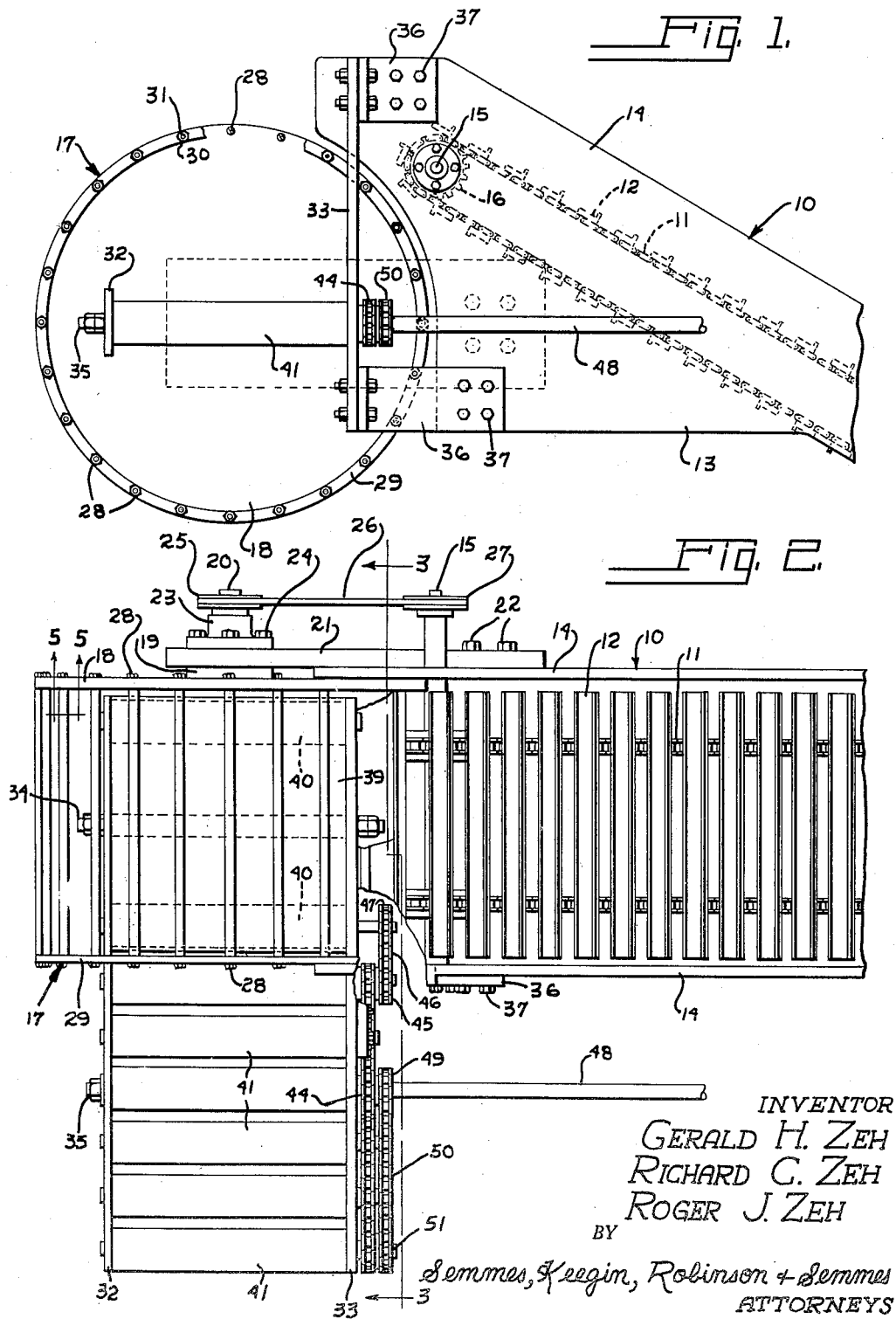

POTATO VINER AND CLEANER

Filed Jan. 21, 1948     2 Sheets-Sheet 2

INVENTOR
GERALD H. ZEH
RICHARD C. ZEH
ROGER J. ZEH
BY
Semmes, Keegin, Robinson & Semmes
ATTORNEYS Patented May 15, 1951

2,553,072

UNITED STATES PATENT OFFICE 2,553,072

POTATO VINER AND CLEANER

Gerald H. Zeh, Richard C. Zeh, and Roger J. Zeh, Calverton, N. Y.

Application January 21, 1948, Serial No. 3,508

2 Claims. (Cl. 209—12)

The present invention relates to apparatus for use with potato digging machines to separate potatoes from refuse incident to harvesting the potatoes, and has particular reference to apparatus for separating potatoes from vines, weeds, dirt and stones.

An object of the present invention is to provide an apparatus for use as an attachment for conventional potato digging machines which effectively separates the potatoes from vines, dirt, stones and other refuse which normally accompany the potatoes as they are taken up from the ground.

A further object is to provide a potato separator which efficiently cleanses the potatoes of foreign materials, including dirt which may cling to the potatoes, and deposits them at a desired collecting point.

A further object is to provide a potato separator which removes vines, stones and other refuse from the potatoes without bruising or otherwise damaging the skins.

Yet a further object is to provide a potato separator wherein means are provided for positively gripping and securing small stones and the like, separating them from the potatoes.

A further object is to provide a novel embodiment of potato separator which may be employed in connection with all types of potato diggers embodying an elevator mechanism, and which is simply and inexpensively constructed.

Other objects and advantages of the invention will be apparent from the following detailed description thereof taken in connection with the drawings, wherein:

Figure 1 is a view of the invention in vertical elevation showing parts of a conventional type potato digger and its relationship to the invention;

Figure 2 is a plan view thereof;

Figure 3:
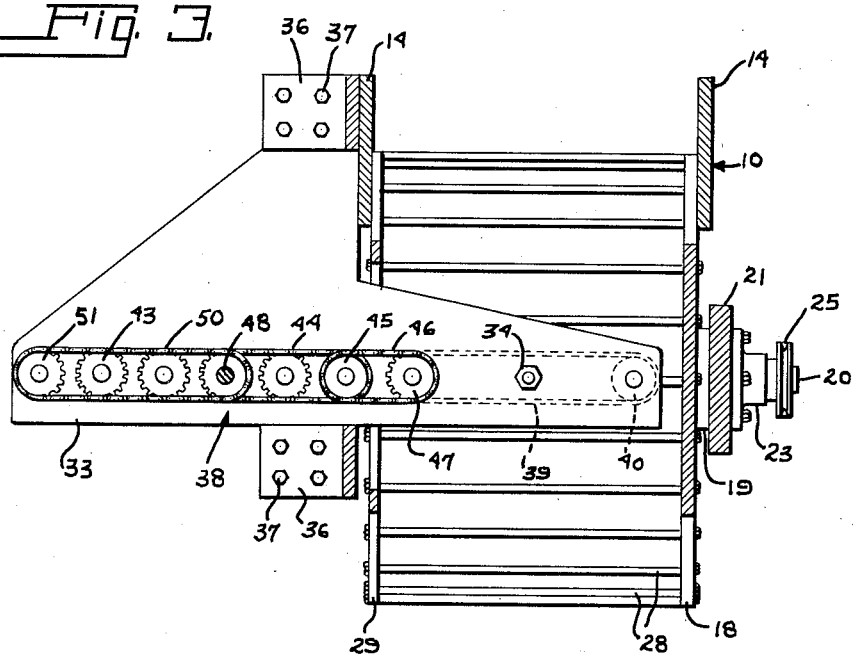
Figure 3 is a view in vertical section taken along the line 3—3 of Figure 2.

The potato digger mechanism with which the invention is adapted to be employed, may be of any conventional type embodying a plow or similar device for uprooting the potato plants and depositing the potatoes, vines and associated dirt, stone and weed refuse onto an elevator mechanism shown generally as 10 in Figure 1 of the drawings. The elevator 10 may comprise an endless chain type conveyor 11 provided with the usual cross bars 12 and positioned in a chute 13 provided with vertically disposed wings 14. The elevator 10 may be powered by any suitable means such as a chain or gear drive operating from a source of power which may be connected with a sprocket at the lower end of the conveyor, not shown. The upper end of the conveyor 11 is supported on a shaft 15 carrying a sprocket wheel 16. The shaft 15 may serve as a power takeoff for operation of a part of the potato separator of the invention, now to be described.

In its broadest concept, the potato separator embodies a rotating frame carrying a plurality of spaced cross bars adapted to receive potatoes and refuse from the elevator 10. Potatoes and heavier materials such as dirt and stones drop through the stripper bars of the frame onto a conveyor positioned inside the frame, the conveyor including a plurality of spaced rollers, alternate rollers being constructed of a resilient compressible material adapted to grasp frictionally small stones, small unmarketable potatoes and other refuse for discharge to the ground beneath the conveyor. Vines, grass and other lighter refuse are thrown off the rotating frame to the rear of the potato separator.

As shown best in Figures 1 and 3, the rotating frame indicated at 17 includes an upright wheel shaped member 18 provided with a projection 19 having a shaft 20 extending therefrom. A heavy supporting plate 21 bolted or otherwise secured at 22, for example, to the potato digger chute 13, extends rearwardly therefrom to support the wheel shaped member 18. This is accomplished by means of a hub 23 which rotatably receives the shaft 20 and is secured to the support 21 by bolts 24. The shaft 20 is provided with a pulley 25 carrying a V-belt 26 connecting with a pulley 27 on the power takeoff shaft 15, whereby the frame 17 is rotated when the elevator 10 of the potato digger is in operation.

Figure 5:
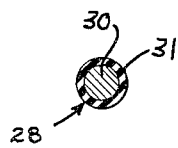
Figure 5 is an enlarged cross sectional view of the stripper bar employed.

As shown in Figure 3, the frame 17 includes a series of regularly spaced stripper bars 28 extending perpendicularly to the vertical plane of the wheel shaped member 18, the free ends of the bars being spaced and secured by a rim or hoop 29, providing an open end for the frame 17. In accordance with the invention, the stripper bars 28 comprise relatively rigid bars of metal or other material shown at 30 coated with a resilient compressible material 31, preferably in the nature of soft sponge rubber, as shown in Figure 5. Other materials having the resilient compressible properties of rubber may be employed in forming the stripper bar coating 31 without departing from the invention. The stripper bars 28 effect separation of vines, grass and lighter refuse from the potatoes, as the potatoes fall through the stripper bars internally of the frame, resisting any tendency of the lighter vines to fall through the stripper bars with the potatoes, and exerting a shearing action as the frame rotates to separate the vines from the potatoes by frictional engagement therewith.

The invention embodies mechanism for receiving potatoes and heavier refuse from the rotating frame 17 and separating stones, lumps of dirt and other refuse from the potatoes as the potatoes are carried to a discharge point. The mechanism includes two vertically disposed plates 32 and 33 secured together by supporting shafts 34 and 35. The plate 33 is secured to the digger frame by angle pieces 36 which may be welded thereto or secured by bolts 37, as shown. The plates 32 and 33 extend internally of the frame 17 through the open end thereof and support a conveyor mechanism indicated at 38, which includes an endless belt 39 supported on wooden rollers 40. The conveyor belt 39 is positioned to receive potatoes and other heavier articles passing through the stripper bars of the rotating frame 17, and preferably comprises a belt made of rubber or other resilient material, presenting a maximum of resistance to the abrasive action of dirt, stones and other refuse which fall on the belt, and receiving the potatoes with a minimum of damage to the skins.

Figure 4:
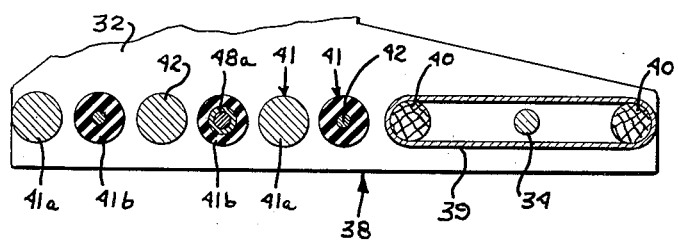
Figure 4 is a view in vertical section partly broken away, of the discharge conveyor mechanism employed to separate stones and dirt from the potatoes, showing the preferred arrangement of the rollers.

As best shown in Figure 4, the conveyor belt 39 discharges vine free potatoes and associated heavier refuse onto a plurality of rollers 41 carried on shafts 42 rotatably journalled in the plates 32 and 33 and arranged in succession in a horizontal plane leading to a desired point of potato disposal. Each roller 41 preferably is spaced from its succeeding roller, to permit of passage of refuse between the rollers. The rollers 41 may be formed of a metal such as steel or similar hard surfaced material, indicated at 41a, with alternate rollers 41 being formed of a resilient compressible material such as sponge rubber or other materials having the characteristics of rubber indicated at 41b, providing a friction or gripping surface assisting the passage of the potatoes over the rollers and effecting the separation of dirt and stones from the potatoes.

The conveyor mechanism including the endless belt 39 and rollers 41 are driven by a common power source at the same rate of speed and in a direction away from the frame 17 leading to a point of discharge, which may be into a container or upon the ground. The rollers 41 are provided with sprockets 43 carrying an endless chain 44, which attains simultaneous rotation of the rollers 41. The roller 41 adjacent the endless belt 39 may be provided with a sprocket 45 carrying an endless chain 46 engaging with a sprocket 47 on the wooden roller 40 supporting the adjacent end of the endless belt 39, securing simultaneous rotation of the endless belt 39 with the rollers.

The conveyor mechanism may be driven by a shaft 48 leading from a suitable power source on the potato digger, not shown. The shaft 48 is journalled rotatably in a hollow shaft 48a provided in one of the rollers 41, shown as the center roller and is in power connection with a roller 41, preferably the roller on the discharge end, through a sprocket 49, an endless chain 50, and a sprocket 51. It will be readily apparent that this power connection may be modified without departing from the invention as for example by the substitution of pulleys and V-belt connections for the chain and sprocket connections shown. The endless chain 44 may be supported by suitable idler rollers, not shown, where necessary. Also, the power connection may be constructed in association with a power takeoff on the digger elevator or any other power source on the potato digger.

In operation, potatoes are removed from the ground by suitable digger mechanism, not shown, and transferred to the delivery elevator 16, along with associated potato vines and considerable loose earth, stones, weeds and other extraneous matter. The potatoes are delivered to the rotating frame 17 by the elevator 16 and drop between the stripper bars 28 which effectively separate the vines, weeds and such from the heavier potatoes, stones, dirt, etc. The potatoes and heavier refuse drop onto the rubber endless belt 39 positioned internally of the rotating frame 17, and the vines and weeds are discharged to the rear of the frame 17. The endless belt 39 discharges the potatoes and remaining refuse onto the rotating rollers 41 which carry the potatoes to a desired discharge point and simultaneously separate dirt and stones therefrom, discharging the material onto the ground. The rubber rollers 41b effectively strip earth from the potatoes which may be adhering thereto, providing a relatively clean potato crop at the point of discharge. Small unmarketable potatoes are also separated from the potatoes of marketable size, the small potatoes passing through the rollers 41 onto the ground.

It will be observed that the present invention provides a potato separator characterized by marked efficiency in operation. Potatoes are effectively screened to remove all dirt, stones, vines and other extraneous matter, and delivered at a desired point of discharge in excellent marketable condition. The potatoes are protected against crushing or bruising during the harvesting and cleansing procedures, minimizing losses to waste. The potato separator of the invention may be operated independently of the potato digging device by separate power means such as a gasoline motor, if convenient. The potato separator rotating frame may be constructed in any desired width so as to accommodate the output of a plurality of potato diggers, merely by extending the length of the stripper bars on the rotating frame and the length of the conveyor belt 39. Belt or gear drives may be employed in the place of the chain drives shown, the chain drives being preferred because of the certainty of the power connection, and the relatively lower cost of such a construction.

The invention may be employed in connection with the harvesting of potatoes or other vegetables and materials having the growth characteristics of potatoes, and is not to be limited in this respect.

While the invention has been described with reference to specific structure and operation, obvious modifications thereof will occur to one skilled in the art, and the invention is not to be limited thereby, except as defined in the appended claims.

We claim:

1. A separator for use with potato diggers, comprising a rotatable frame to receive potatoes and associated refuse, a chute for delivering potatoes and refuse to the external periphery of the frame, spaced bars on the frame forming stripper mechanisms for separating vines and other light refuse from the potatoes, means for rotating the frame to strip the potatoes, a conveyor inside the frame to receive potatoes and heavy refuse falling through the spaced bars, and a plurality of spaced rollers positioned in an extension of the conveyor and extending to one side of the frame to receive material from the conveyor for separating heavy refuse such as stones and dirt from the potatoes and delivering cleansed potatoes to a discharge point at the side of the potato digger.

2. A separator for use with potato diggers, comprising a rotatable frame, spaced cross bars on the frame forming vine stripper mechanisms, a chute for delivering potatoes and refuse onto the spaced bars on the frame, a conveyor inside the frame for receiving potatoes and other refuse passing through the stripper mechanisms, a plurality of spaced rollers positioned in an extension of the conveyor and to one side of the frame for receiving the discharge of the conveyor, and means for actuating the conveyor and rotating the rollers to effect movement of the potatoes with simultaneous separation of remaining refuse from the potatoes and to deliver the cleansed potatoes to a discharge point.

GERALD H. ZEH.
RICHARD C. ZEH.
ROGER J. ZEH.

REFERENCES CITED

The following references are of record in the file of this patent:

UNITED STATES PATENTS

| Number | Name | Date |
| --- | --- | --- |
| 118,895 | Baker | Sept. 12, 1871 |
| 472,299 | Krapp | Apr. 5, 1892 |
| 747,771 | Richter | Dec. 22, 1903 |
| 770,079 | Lamb | Sept. 13, 1904 |
| 1,059,129 | Edwards et al. | Apr. 15, 1913 |
| 1,089,034 | Baker | Mar. 3, 1914 |
| 1,130,403 | Hoover | Mar. 2, 1915 |
| 1,135,606 | Newhouse | Apr. 13, 1915 |
| 1,169,288 | Sexton | Jan. 25, 1916 |
| 1,275,099 | Steele | Aug. 6, 1918 |
| 1,313,011 | Pinger | Aug. 12, 1919 |
| 1,545,331 | Kaape et al. | July 7, 1925 |
| 1,876,150 | Pearson | Sept. 6, 1932 |
| 1,895,157 | Gailus | Jan. 24, 1933 |
| 2,277,450 | Parr | Mar. 24, 1942 |

FOREIGN PATENTS

| Number | Country | Date |
| --- | --- | --- |
| 856,905 | France | Apr. 1, 1940 |